United States Patent [19]

Steinman

[11] 4,137,048
[45] Jan. 30, 1979

[54] INSULATING FOAM PRODUCING AND DELIVERING APPARATUS, AND FOAM GUN THEREFOR

[76] Inventor: Gerald H. Steinman, 17 Ironwood La., Millis, Mass. 02045

[21] Appl. No.: 816,426

[22] Filed: Jul. 18, 1977

[51] Int. Cl.² ............................ B01F 3/10; B01F 5/04; B01F 15/04
[52] U.S. Cl. ............................ 422/133; 261/DIG. 26; 366/280; 366/165; 366/143; 137/607; 137/559; 422/135
[58] Field of Search ............................ 23/252 R, 285; 260/2.5 BC; 261/DIG. 26; 137/607; 239/112, 154, 414; 259/6–10; 366/143, 165, 280

[56] References Cited

U.S. PATENT DOCUMENTS

| 3,043,670 | 7/1962 | Vieli | 23/285 |
| 3,451,786 | 6/1969 | Perrin | 23/285 |
| 3,623,705 | 11/1971 | Townsley et al. | 259/8 |
| 3,776,525 | 12/1973 | Warner | 259/7 |

*Primary Examiner*—James H. Tayman, Jr.
*Attorney, Agent, or Firm*—Cesari and McKenna

[57] ABSTRACT

Insulating foam producing and delivering apparatus includes foaming agent and resin supplies, means for delivering the foaming agent and resin and also air under pressure and a foam gun for generating the foam and mixing the foam with the resin. The foam gun includes a foaming chamber in which foaming agent and air are discharged in jets so as to impact against blades of a free spinning propeller which is turned by jets to create a mixing turbulence and thereby whips the foaming agent and air into the desired froth or foam. The foam is combined with the resin through an extended resin discharge nozzle located downstream of the foaming chamber so as to confine the resin mixing essentially to the output applicator or dispenser hose and thereby to minimize clogging due to hardened resin residue. Transparent air, foaming agent and resin supply lines enable constant monitoring of the ingredients and facilitate the maintenance of the desired foam density and other desired conditions of the foam.

20 Claims, 3 Drawing Figures

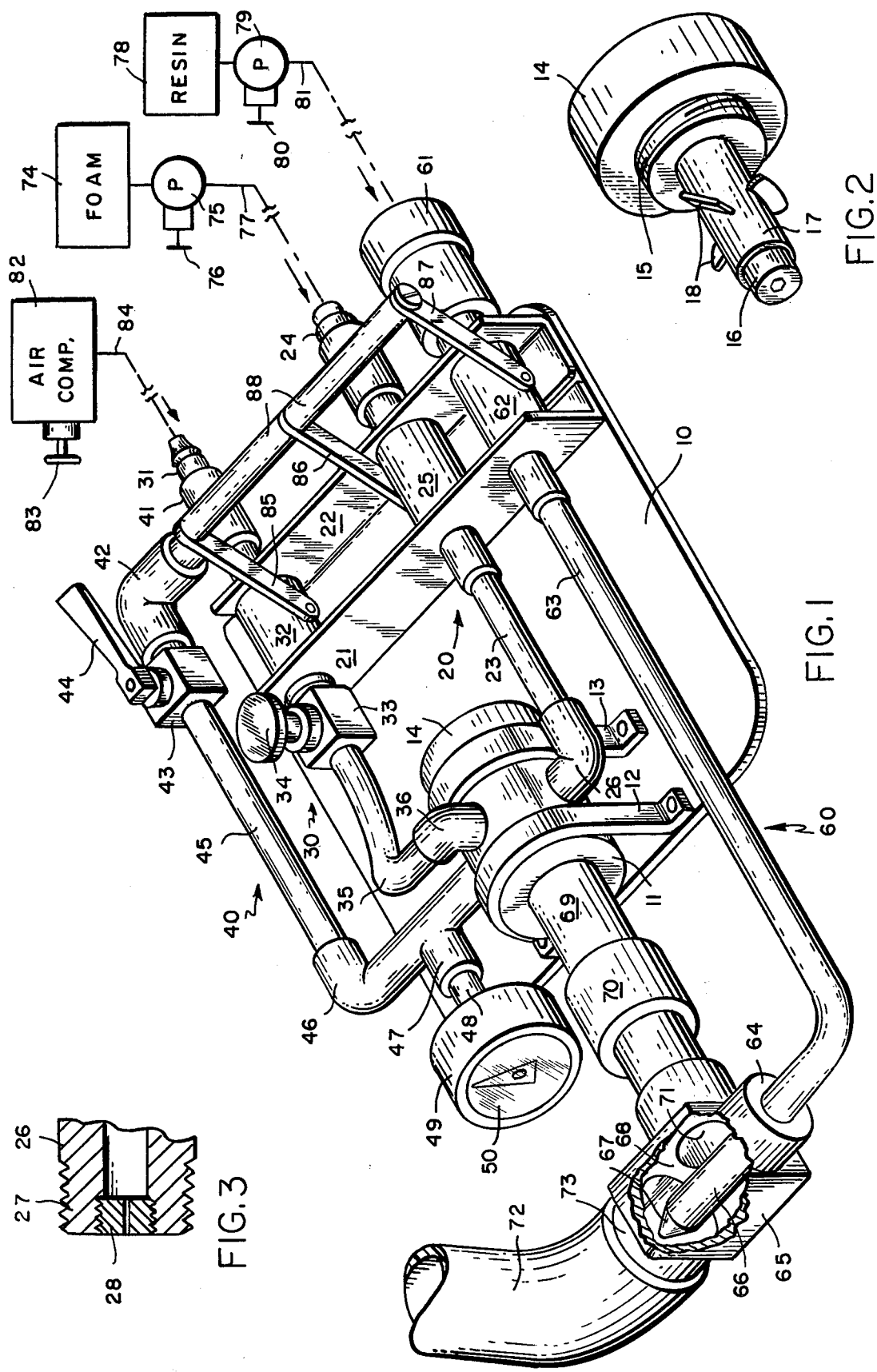

INSULATING FOAM PRODUCING AND DELIVERING APPARATUS, AND FOAM GUN THEREFOR

BACKGROUND OF THE INVENTION

The insulating qualities or properties of homes and other buildings can be significantly enhanced by the spraying within their outside and other walls of a foam resin produced by mixing a solution of a curable synthetic resin, for example, a urea-formaldehyde condensate, with a foamed solution of a foaming agent. A solution of a foaming agent provided with a curer or acid hardener for the synthetic resin, is first converted into a foam, and then is mixed as a foam with the solution of the sythentic resin.

The production of the insulating foam spray is attened by numerous problems. The synthetic resin has a short shelf life, and is constantly changing in viscosity due to aging and also to temperature changes. Heretofore, the foaming agent has had to be applied by forcing under pressure and in combination with compressed air through glass spheres or fine mesh screens having small holes subject to clogging by the resin residue as cured or hardened in the foam apparatus or gun by the acid hardener added to the foaming agent solution.

Further, the pressures at which the air, foaming agent and resin are delivered to and mixed or combined in the gun must be constantly monitored or adjusted, for best insulating quality or ideal density of the foamed resin, and to accommodate changes in the resin and temperature conditions.

Heretofore, it has not been possible with the available equipment to maintain the ideal density or wanted creamy consistency of the foam or to avoid excessive down time for cleaning of the equipment to rid it of the accumulating hardening resin residue, the spray delivery obstructing by which has produced a back pressure yielding in turn a clogging of the foam gun beads, blades, screens, orifices, stirrers and the like.

The insulating foam producing and delivering apparatus of this invention provides a foam gun from which the aforesaid beads, screens and the like, and hence the gun clogging thereby, are eliminated; to which means for monitoring and thereby correcting for clogging or backpressure buildup are added; and in which the combining of the foam with the resin is essentially confined to the applicator or dispenser hose.

While the invention apparatus or foam gun is thus minimally subject to the buildup of clogging residue, it is further provided with single-action means for conjoint shutoff of the metered air and pressurized foam and resin supplies, together with single action, bypass, full-air-pressure blowout of the gun.

The foam gun hereof is provided further, in combination with the virtually instant shutoff and blowout means, with a quick disconnect between the foam generating and foam-resin combining chambers, whereby upon shutoff, the gun may be separated for any needed cleaning of the parts while subjecting the equipment to the absolute minimum of downtime.

Further under this invention, the foam gun's air, foam and resin lines are provided with clear lengths, whereby the supplies to the foam generating and foam-resin combining chambers may be monitored or visually observed for unwanted changes or conditions, such as moisture in the air line signifying a water accumulation that must be removed from the air compressor.

BRIEF SUMMARY OF INVENTION

An insulating foam producing and delivering apparatus includes foaming agent and resin supplies, means for delivering the foaming agent and resins and also air under pressure and a foam gun for foam generating by mixing the foam solution and air with a spinner, and for foam-resin combining by mixing the resin with the foam through an extended resin discharge nozzle whereby all said foam-resin mixing is kept away from the gun passages and confined to the foam applicator or dispenser hose. The apparatus further has improved means for constant monitoring and thereby maintaining the wanted density and other desired conditions of the foam.

BRIEF DESCRIPTION OF DRAWINGS

In the accompanying drawings of a preferred embodiment:

FIG. 1 shows the foam gun in perspective, and schematically illustrates the apparatus elements that supply the gun;

FIG. 2 is a perspective of the gun's foaming spinner or propeller; and

FIG. 3 is a section of the orifices inletting the compressed air and pressurized foaming agent to the foam generating chamber of the gun.

DETAILED DESCRIPTION OF INVENTION

In the preferred embodiment of the drawings, the foam gun comprises a flat, generally rectangular mount or base plate 10 on and by which the other foam gun elements are supported and integrated, and which in turn may be supported or hung, as by a strap or hook (not shown) from the operator's shoulder or waist, and for convenient, both-hands manipulation by the operator of the gun's discharge hose and pressure control and shut off valves.

A cylindrical foaming chamber 11 is supported on base plate 10 by hold down clamps 12, 13 tightly engaged about the chamber opposite ends.

Means are provided for creating a complete foam mixture within the foaming chamber 11 of foaming agent and air supplied thereto, herein comprising a propeller supported from chamber end wall or cap 14 removably engaged to the chamber 11 as by a reduced annular shoulder or neck 15 threaded as shown for screwing into the chamber. The propeller comprises a shoulder bolt 16 screwed into end cap 14 and having rotatably received on its shank a spinning sleeve or shaft 17 mounting in turn a set of radially projecting vanes or blades 18 that are divergent from or inclined to the longitudinal axis of the bolt 16 and shaft 17.

A foaming agent line 20 extends lengthwise and to one side of the foaming chamber 11 from beyond one base 10 end to a side point intermediate the chamber 11 ends, and is firmly or rigidly held in the indicated position above the base 10 by passing through the vertical or upright faces of a pair of angle irons or plates 21, 22 whose bottom, lateral flanges are affixed to the base 10 in any convenient manner.

Intermediate chamber 11 and the angles 21, 22 the foaming agent line 20 has a clear or PVC length 23 whereby the gun operator may visually observe the rate and condition of foaming agent passing therethrough.

At its outer end the line 20 is fitted with an adaptor or quick coupling male element 24 for receiving thereover the free end of a foaming agent supply means to be described.

Intermediate the angles 21, 22 the foaming agent line 20 is fitted with a rotary valve 25, of conventional construction and rotating about a horizontal, transverse axis through, say, a quarter turn between full open and closed positions.

At its inner end the foaming agent line 20 terminates in an elbow 26, FIGS. 1 and 3, inletting to the chamber 11 and tightly secured thereto as by threads 27.

A ring 28 having a small central opening therethrough is threaded into the chamber inletting end of the elbow 26, and comprises thereat a restricted orifice whereby in its discharge from the line 20 to the chamber 11 the foaming agent is accelerated and formed into a jet that impacts the propeller blades 18.

An air line 30 is also two point supported from base 10 through angles 21 22, extends from beyond the same base 10 end longitudinally of and at the other side of foaming chamber 11, turns inwardly-upwardly over chamber 11 through clear PVC hose length 35, and is inletting to or opens into the top of chamber 11 as through an elbow 36 secured as, and having the same restricted orifice 28 as, the elbow 26.

At its outer end air line 30 is provided with or terminates in an adaptor or male quick coupling element 31 receiving the free end of an air line as to be described.

Intermediate the angles 21, 22 air line 30 has a rotary valve 32 of conventional construction and, like valve 25, quick rotatable through say a quarter turn between full open and closed positions.

Beyond angle 21 air line 30 incorporates a needle valve 33 having the usual rising or threaded stem manually manipulable by the knob or handle 34 for control and adjustment by the gun operator of solely the air pressure, or foam density.

An air bypass line 40 branches from air line 30 at a tee 41, turning from that through elbow 42 to extend longitudinally of the chamber 11 to a point intermediate the chamber ends, and at the opposite side thereof from the foam line 20.

Beyond elbow 42 bypass line 40 incorporates a toggle valve 43 which is normally closed, but which may be opened in a single quick motion by forcing the handle 44 from the indicated horizontal to an upright position, in which as conventionally it is spring-retained.

The air bypass line 40 extends therebeyond through a clear or PVC length 45 to an elbow 46 inletting to the foam chamber 11 at the opposite side from foaming agent line 20.

Elbow 46 is branched at 47 to receive stem 48 of a pressure gauge 49 having a face or dial 50 which is upfacing, or readily seen by the gun operator, when the gun is in the normal operating position of being hung or suspended from the operator's waist or belt.

A resin line 60 is supported from base 10 through angles 21, 22 and extends lengthwise of foaming chamber 11 from beyond the same end of base 10, terminating thereat in an adaptor or female quick coupling element 61 for receiving the free end of a resin supply conduit as to be described.

The resin line 60 is also fitted between the angles 21, 22 with a rotary valve 62 which, like the similar valves 25, 32, is quarter turn openable-closable about a horizontal transverse axis. Beyond the angle 21 the resin line 60 extends as a clear or PVC length 63 that inturns beyond the opposite end of base 10 to reception within the near end 64 of a tee 65, within which the resin line terminates as an extended discharge nozzle 66 culminating in a usual small or restricted orifice cone or tip 67.

Nozzle tube 66 is supported at its other, resin receiving end from or within tee end 64, and for extending lengthwise of the tee and centrally of a foam-resin combining chamber 68 formed therewithin.

Outletting from foaming chamber 11 is a discharge line 69 having intermediate its ends a quick disconnect coupling 70, and which is inletting at side or branch opening 71 to the tee 65. Discharge line 69 rigidly supports tee 65 beyond the end of base 10, and by manipulation of disconnect 70, and through the flexabilty of resin line length 63, permits the withdrawal or separation of the tee 65 from line 69 for access to and cleaning of the parts.

The extended resin discharge nozzle 66, extends at its tip 67 out of chamber 68 and to within the coupled end of a suitable or flexible applicator hose 72 of wanted length, and whose said end is clamped or otherwise secured to the opposite end 73 of tee 65.

The insulating foam producing and delivering apparatus hereof further comprises a foam supply, tank or drum 74 and means or pump 75 for pumping the foaming agent from said supply 74 under pressure regulated by a usual adjusting means 76 through a supply conduit 77 terminating in means such as a female quick coupling element mating with and for removable reception on gun foaming agent line element 24.

A like resin supply tank or drum 78 has means such as pump 79 for pumping resin from said supply 78, at a pressure regulated by a usual adjusting means 80, and through a supply conduit 81, provided at its free end with means such as a male quick disconnect element mated to and for removable reception in resin line female element 61.

Air is supplied to the apparatus by a compressor 82 having a usual regulating means 83, and through a supply conduit 84 having means such as a female quick disconnect element mated to and for removable reception over air line element 31.

In the operation of the apparatus and gun the air compressor 82 is started and adjusted to a pressure of about 85 psi, and the pumps 75 and 79 started and adjusted to a foaming agent and resin pressure of about 125 psi. Needle valve 33 is then adjusted by opening knob 34 one to two turns to bring the foam to the proper density as specified by the manufacturer.

The gun is then strapped on the operator's waist, and the applicator hose 72 held in and positioned by one or the left hand. Finally the gun is turned on by shifting the valves 25, 32, 62 from the full closed position shown to their full open position by tandem swinging of the valve handles or levers 85, 86, 87 counterclockwise or right to left through the about ¼ turn reguired for that, by grasping and pulling up on gang bar 88 through which said valve handles 85, 86, 87 are openable together by said other or right hand pull-up.

To clean the applicator hose 72, the gun is turned off by pushing the handle 88 back down to the off position shown, and the toggle valve 43 is opened by lifting its handle 44 to the vertical position, whereby the full 85 psi compressor air pressure is conducted through bypass line 40, chamber 11, and discharge line 69 to combining chamber 68 and therefrom to said hose 72.

By constant observance of back pressure gauge 50, and only thereby, the gun operator is enabled to continuously regulate or adjust the air pressure to constantly assure foam of the proper quality, or density.

It will be understood that the air and liquid streams to the chamber 11, as metered and jetted by their inlet orifices 28, in impacting the blades 18 turn or rapidly rotate the propeller, which in turn creates the wanted solution-air mixing turbulence, or agitates or whips the liquid and air into the desired froth or foam. By lowering the air pressure the air bubble size is reduced, and the foam density, or weight per volume, is increased; and vice versa.

Needle valve 33 is set as aforementioned for a gauge pressure of say 20 to 24 psi. Upon detecting a rise in the gauge pressure, possibly signalling resin setting in or blockage of applicator hose 72, the operator cleans said hose, by the described procedure of turning off the gun, and opening the bypass valve 43.

Should the foam operation be stopped for short periods of time, the applicator hose 72 is blown out as described, and the tee 65 is pulled out from discharge line 69 by pulling back the sleeve or ring of quick disconnect 70. Any resin build up around discharge nozzle orifice 67 is then cleaned up to insure no leakage of resin back into or so as to set or harden in foaming chamber 11.

I claim:

1. Insulating foam producing and deliving apparatus comprising
    a foaming agent supply;
    a foaming agent supply conduit;
    means for pumping said foaming agent from said supply through said conduit;
    means for adjusting the pressure of said foaming agent pumping;
    a resin supply;
    a resin supply conduit
    means for pumping resin from said supply through said conduit;
    means for adjusting the pressure of said resin pumping;
    an air supply conduit;
    means for compressing the air in said supply conduit;
    means for regulating the pressure of said air compressing;
    a foam gun comprising
    a base,
    a foam generating chamber supported on said base,
    a foaming agent line supported on said base, inletting to said foam generating chamber, and coupled to said foaming agent supply conduit,
    an air line supported on said base, inletting to said foam generating chamber, and coupled to said air supply conduit;
    a resin injector nozzle,
    a resin line supported on said base, inletting to said resin injector nozzle, and coupled to said resin supply conduit;
    means in said foam generating chamber for creating a complete foam mixture therewithin of the foaming agent and air supplied thereto, said mixing means comprising a free spinning propeller in said foam generating chamber turned at high speed by said inletted air and foaming agent to thereby create a mixing turbulence that whips the air and foaming agent into the desired foam,
    a foam combining chamber surrounding said resin injector nozzle,
    a discharge line conducting said foam mixture from said foam generating chamber to said foam combining chamber, and
    a foam applicator line outletting from said resin injector nozzle and from said nozzle surrounding, foam combining chamber, and in which takes place all mixing of said resin with said foam.

2. The apparatus of claim 1 wherein said propeller comprises a shaft secured to and extending axially inward from an end of said chamber, a sleeve on said shaft, and inclined vanes on said sleeve.

3. The apparatus of claim 1, wherein said discharge line rigidly supports said foam combining chamber from said foam generating chamber.

4. The apparatus of claim 1, and a quick disconnect coupling in said discharge line whereby said foam combining chamber may be quickly disconnected from said foam generating chamber for cleaning.

5. The apparatus of claim 1, and
    a manually manipulable needle valve in said air line and adjustable to regulate the pressure thereat of said compressed air, and thereby the density of the foam ejected from said applicator line.

6. The apparatus of claim 1 and restricted orifices at the inlets of said air and foaming agent lines to said foam generating chamber, whereby said compressed air and pumped foaming agent impact said propeller as accelerated jets.

7. The apparatus of claim 5, and
    a bypass line branching from said air line ahead of said needle valve and inletting to said generating chamber, and
    a normally closed blow-by valve in said bypass air line, said blow-by valve full openable by a single motion to immediately clear said foam applicator line.

8. The apparatus of claim 1, and
    rotary valves in said foaming agent, air and resin lines,
    parallel upstanding levers for turning said valves, and
    a gang bar connecting said levers and manually manipulable for simultaneously opening and closing all said valves.

9. The apparatus of claim 1, wherein said foam combining chamber comprises
    a cylindrical body supporting said resin injector nozzle centrally longitudinally therewithin and from one end thereof, and wherein said foam generating chamber discharge line has
    a side connection to and forms a tee with said foam-resin mixing chamber.

10. In an insulating foam producing and delivering apparatus, a foam gun comprising
    a base,
    a foam generating chamber supported on said base,
    a foaming agent line supported on said base, inletting to said foam generating chamber, and adapted to be coupled to a foaming agent supply conduit,
    an air line supported on said base, inletting to said foam generating chamber, and adapted to be coupled to an air supply conduit,
    a resin injector nozzle,
    a resin line supported on said base, inletting to said resin injector nozzle, and adapted to be coupled to a resin supply conduit,
    means in said foam generating chamber for creating a foam mixture therewithin of foaming agent and air supplied thereto, said mixing means comprising a free spinning propeller in said foam generating chamber turned at high speed by said inletted air and foaming agent to thereby create a mixing turbulence that whips the air and foaming agent into the desired foam, a foam combining chamber surrounding said resin injector nozzle, a discharge line conducting said foam mixture from said foam generating chamber to said foam combining chamber, and a foam applicator line outletting from said resin injector nozzle and from said nozzle surrounding, foam combining chamber, and in which takes place all mixing of said resin with said foam.

11. The apparatus of claim 10, wherein said propeller comprises a shaft secured to and extending axially inward form an end of said chamber, a sleeve on said shaft, and inclined vanes on said sleeve.

12. The apparatus of claim 10, wherein said discharge line rigidly supports said foam combining chamber from said foam generating chamber.

13. The apparatus of claim 10, and a quick disconnect coupling in said discharge line whereby said foam combining chamber may be quickly disconnected from said foam generating chamber for cleaning.

14. The apparatus of claim 10, and a manually manipulable needle valve in said air line and adjustable to regulate the pressure thereat of said compressed air, and thereby the density of the foam ejected from said applicator line.

15. The apparatus of claim 10 and restricted orifices at the inlets of said air and foaming agent lines to said foam generating chamber, whereby said compressed air and pumped foaming agent impact said propeller as accelerated jets.

16. The apparatus of claim 14, and a bypass line branching from said air line ahead of said needle valve and inletting to said foam generating chamber, and a normally closed blow-by valve in said bypass air line, said blow-by valve full openable by a single motion to immediately clear said foam applicator line.

17. The apparatus of claim 10, and rotary valves in said foaming agent, air and resin lines, parallel upstanding levers for turning said valves, and a gang bar connecting said layers and manually manipulable for simultaneously opening and closing all said valves.

18. The apparatus of claim 10, wherein said foam combining chamber comprises a cylindrical body supporting said resin injector nozzle centrally longitudinally therewithin and from one end thereof, and wherein said foam generating chamber discharge line has a side connection to and forms a tee with said foam-resin mixing chamber.

19. The apparatus of claim 1, wherein each of said foaming agent line, said air line and said resin line has a transparent length therein, whereby the supplies to said foam generating chamber and said foam combining chamber may be monitored for unwanted changes likely to affect the desired conditions of the foam.

20. The apparatus of claim 10, wherein each of said foaming agent line, said air line and said resin line has a transparent length therein, whereby the supplies to said foam generating chamber and said foam combining chamber may be monitored for unwanted changes likely to affect the desired conditions of the foam.

* * * * *